US008118376B2

(12) United States Patent
Watanabe et al.

(10) Patent No.: US 8,118,376 B2
(45) Date of Patent: Feb. 21, 2012

(54) DISPLAY RACK

(75) Inventors: Toshiki Watanabe, Kanagawa (JP); Takashi Shima, Kanagawa (JP); Shingo Niinuma, Kanagawa (JP); Koji Miura, Tokyo (JP)

(73) Assignee: Sony Corporation, Tokyo (JP)

( * ) Notice: Subject to any disclaimer, the term of this patent is extended or adjusted under 35 U.S.C. 154(b) by 1052 days.

(21) Appl. No.: 12/026,169

(22) Filed: Feb. 5, 2008

(65) Prior Publication Data

US 2008/0185485 A1 Aug. 7, 2008

(30) Foreign Application Priority Data

Feb. 6, 2007 (JP) ................................ 2007-027065

(51) Int. Cl.
*H04R 1/02* (2006.01)
*H04R 9/06* (2006.01)
*A47B 81/00* (2006.01)
*A47B 97/00* (2006.01)
(52) U.S. Cl. ..................................... 312/223.1; 381/333
(58) Field of Classification Search .................. 381/333, 381/304, 301; 312/223.1
See application file for complete search history.

(56) References Cited

U.S. PATENT DOCUMENTS

| | | | | |
|---|---|---|---|---|
| 3,113,633 A * | 12/1963 | Eberhardt et al. | ............ | 181/145 |
| 3,491,204 A * | 1/1970 | Sherno | ........................... | 381/301 |
| 4,590,866 A * | 5/1986 | Schairbaum | .................... | 108/23 |
| 5,066,078 A * | 11/1991 | Wurst | ............................ | 312/114 |
| 5,410,972 A * | 5/1995 | Schairbaum | ............... | 108/50.01 |
| 5,651,594 A * | 7/1997 | Lechman | ...................... | 312/194 |
| 5,697,305 A * | 12/1997 | Chasan et al. | .................. | 108/90 |
| 5,699,744 A * | 12/1997 | Lechman | ....................... | 108/109 |
| 6,012,694 A * | 1/2000 | Sullivan, III | .................. | 248/323 |
| 6,237,507 B1 * | 5/2001 | Yanagisawa et al. | ............. | 108/3 |
| 6,381,335 B2 * | 4/2002 | Juszkiewicz et al. | ......... | 381/306 |
| 6,516,070 B2 * | 2/2003 | Macey | .......................... | 381/152 |
| 6,601,931 B1 * | 8/2003 | Schairbaum et al. | ......... | 312/194 |
| 7,846,026 B2 * | 12/2010 | Stephenson et al. | ............ | 463/46 |
| 2001/0053231 A1 * | 12/2001 | Juszkiewicz et al. | ......... | 381/306 |
| 2005/0137019 A1 * | 6/2005 | Ikeda | .............................. | 463/46 |

FOREIGN PATENT DOCUMENTS

JP 1-297006 11/1989

* cited by examiner

*Primary Examiner* — Anh Mai
*Assistant Examiner* — Alexander Talpalatskiy
(74) *Attorney, Agent, or Firm* — Oblon, Spivak, McClelland, Maier & Neustadt, L.L.P.

(57) ABSTRACT

A display rack, on which a display apparatus is mounted, is provided. The display rack includes an amplifier, a top board portion, a transparent top board portion, and a display portion. The amplifier amplifies an audio signal input from a signal source of the display apparatus. The top board portion stores the amplifier. The transparent top board portion is formed of a transparent member and arranged above the top board portion. The display portion indicates a status of the amplifier and is arranged under the transparent top board portion with a display surface thereof facing upward.

6 Claims, 9 Drawing Sheets

DISPLAY RACK

CROSS REFERENCES TO RELATED APPLICATIONS

This invention contains subject matter related to Japanese Patent Application JP 2007-027065 filed in the Japanese Patent Office on Feb. 6, 2007, the entire contents of which being incorporated herein by reference.

BACKGROUND OF THE INVENTION

1. Field of the Invention

This invention relates to a display rack capable of mounting a display apparatus such as a television receiver on the top surface thereof. Particularly, the invention relates to the display rack including an amplifier and a display portion indicating a status of the amplifier.

2. Description of the Related Art

Display racks capable of mounting a television receiver or other apparatuses have been used. Recently, such display racks incorporating an amplifier that amplifies audio signals output from the television receiver, an audio apparatus and a video apparatus stored in such display racks, and a speaker that outputs the amplified audio signals have been increasingly used.

Such display racks may need a display portion to indicate the ON/OFF state of power supply and indicate the status of an electric device such as an amplifier to the user. FIG. 1 shows an example of a display rack according to related art in which such display portion is provided on the front surface of the display rack. A display rack 200 shown in FIG. 1 includes a top board portion 213, right and left leg portions 212a, 212b, and a shelf board portion 214. A television receiver or the like is mounted on the top board portion 213. The right and left leg portions 212a, 212b support the top board portion 213. The shelf board portion 214 extends between the leg portions 212a, 212b. An amplifier 250 is incorporated in the top board portion 213 of the display rack 200 and a display portion 260 indicating the status of the amplifier 250 is provided on the front surface of the top board portion 213.

Further, FIG. 2 shows another example of such display rack according to related art in which the display portion is provided on the top surface of the display rack. A display rack 210 shown in FIG. 2 includes the top board portion 213, leg portions 212a, 212b, and shelf board portion 214 similar to those shown in FIG. 1. In addition, the display portion 260 indicating the status of the amplifier 250 is provided to a right end portion on the top surface of the top board portion 213.

Japanese Unexamined Patent Application Publication No. H01-297006 discloses a piece of furniture for a living room storing an audio/video apparatus and provided with a display portion to display the state of a control device controlling the audio/video apparatus.

SUMMARY OF THE INVENTION

Typically, a display rack for mounting a television receiver or other apparatus is arranged and used in a living room or the like, so that the design thereof may require such quality as a part of interior decoration. Therefore, such display rack may use materials giving a sense of quality, use a glass material for the top board portion, shelf board portion and the like. However, a display portion for displaying a status of the electric device is typically formed of a FL (Fluorescent Lamp), a liquid crystal panel or the like. Therefore, it may be difficult for such elements to be matched with the materials constituting the top board portion and the leg portions of the display rack. That is, when being provided on the front surface or the top surface of the display rack, the display portion may affect the appearance of the display rack.

In addition, if such display portion is provided on the front surface or the top surface of the display rack, a cover to protect the display portion may be required. With such cover being added, the display rack may have a complicated structure and the cost thereof may increase. Further, if the display portion is provided on the top board portion of the display rack, unevenness due to the provided display portion may restrict the position of a television receiver or the like arranged on the top board portion.

It is desirable to provide a display portion indicating the status of an electric device inexpensively without affecting the appearance of a display rack.

According to an embodiment of this invention, there is provided a display rack on which a display apparatus is mounted. The display rack includes an amplifier, a top board portion, a transparent top board portion, and a display portion. The amplifier amplifies an audio signal input from a signal source of the display apparatus. The top board portion stores the amplifier. The transparent top board portion is formed of a transparent member and provided above the top board portion. The display portion indicates a status of the amplifier and is arranged under the transparent top board portion with a display surface thereof facing upward.

Accordingly, details displayed on the display portion can be checked through the transparent top board portion provided above the top board portion.

According to the embodiment of this invention, since the display portion is provided under the transparent top board portion, the display portion may not affect the appearance of the display rack.

DESCRIPTION OF THE PREFERRED EMBODIMENTS

Embodiments according to this invention will be described with reference to FIGS. 3 to 11. The embodiments of this invention are applied to a display rack on which a display apparatus such as a television receiver is mounted. This display rack according to the embodiments incorporates an amplifier amplifying an audio signal supplied from a signal source of the television receiver and speaker units corresponding to a 3.1 channel surround sound system.

Figure 1:
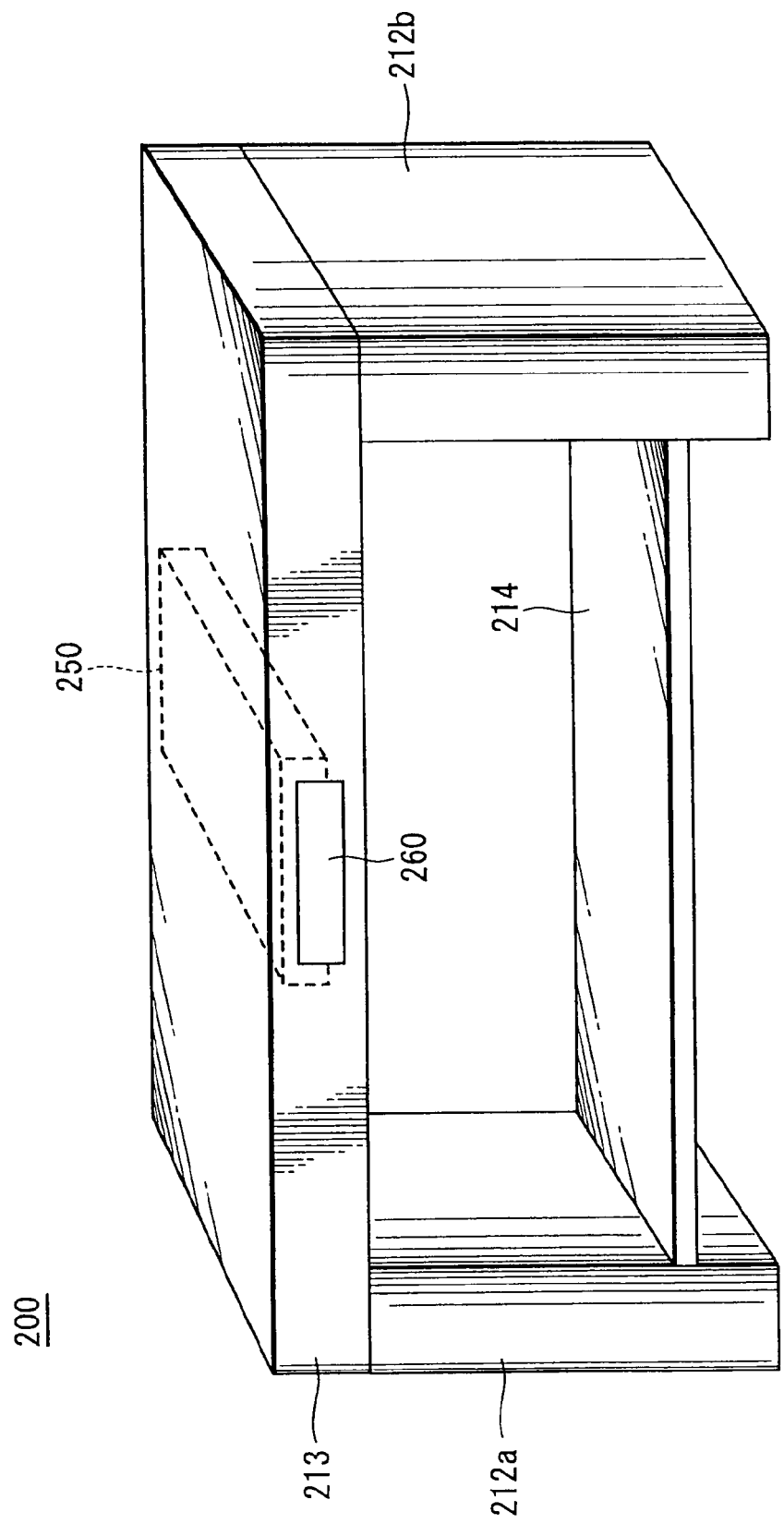
FIG. 1 is a perspective view of an example of a structure of a display rack according to related art.
Figure 2:
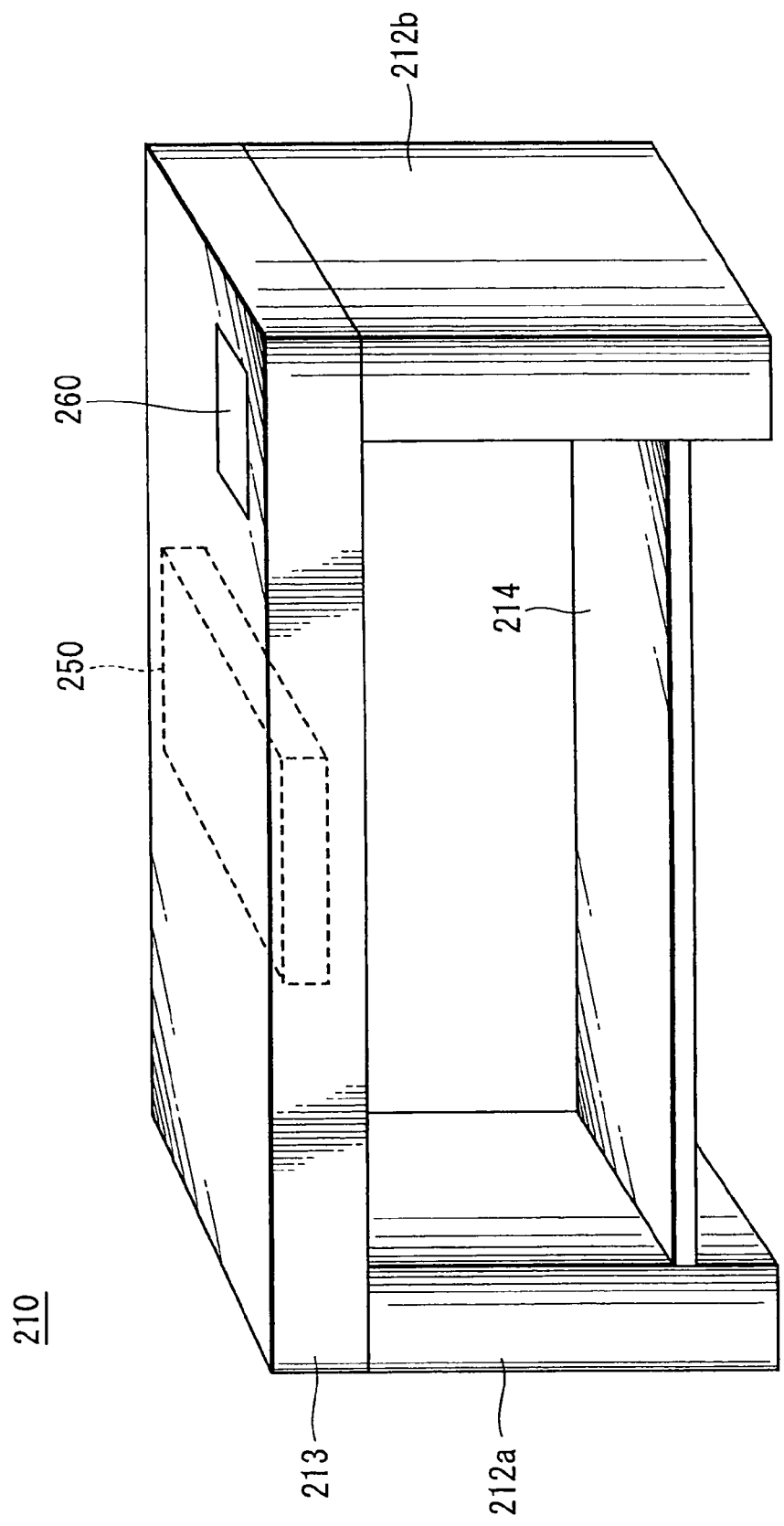
FIG. 2 is a perspective view of another example of a structure of a display rack according to related art.
Figure 3:
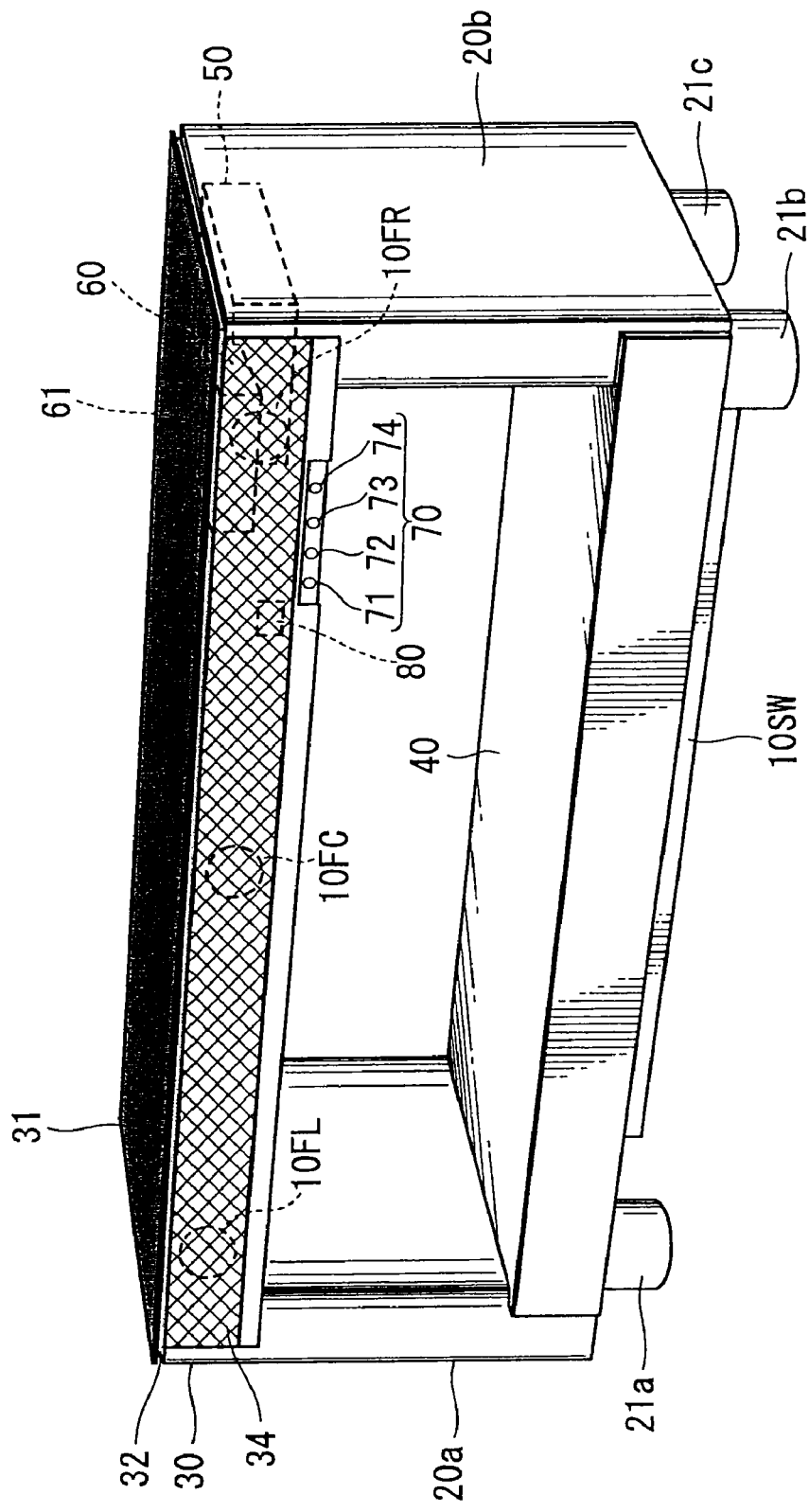
FIG. 3 is a perspective view of an example of a structure of a display rack according to an embodiment of this invention.

FIG. 3 is a perspective view of an example of a display rack according to the embodiment of this invention. As shown in FIG. 3, a display rack 100 includes a glass top board portion 31, a top board portion 30, leg portions 20a, 20b, and a shelf board portion 40. A display apparatus such as a television receiver is arranged on the glass top board portion 31. The top board portion 30 is provided under the glass top board portion 31. The leg portions 20a, 20b support the top board portion 30. The shelf board portion 40 extends between the leg portions 20a, 20b. Below the shelf board portion 40 are provided four leg portions 21a to 21d (leg portion 21d is not shown in the figure) supporting the whole of the display rack 100. The glass top board portion 31 is formed of a transparent glass plate.

An audio/video apparatus such as an apparatus for DVDs (Digital Versatile Disks) may be mounted on the shelf board portion 40. The top board portion 30 stores an amplifier 50 that amplifies audio signals output from the audio/video apparatus mounted on the shelf board portion 40 and output from the television receiver mounted on the glass top board portion 31 and a plurality of speaker units that output the audio signals amplified in the amplifier 50. As shown in FIG. 3, respective portions stored in the top board portion 30 are expressed with broken lines.

A front-left speaker unit 10Fl, front-center speaker unit 10FC, front-right speaker unit 10FR are arranged as speaker units in this order from the left end. Sound emitting portions of the respective speaker units are directed to the front surface of the top board portion 30 and covered with a grill net 34 for preventing dust. A subwoofer responsible for sound in a bass frequency range (0.1 channel) among the speakers constituting such speaker unit 10 is provided in a subwoofer box 10SW arranged under the shelf board portion 40.

The glass top board portion 31 is arranged above the top board portion 30 with a glass-top-board-portion support member 32 in between. Under the glass top board portion 31 is provided a display portion 60, indicating a status of the amplifier 50, with a display surface 61 thereof facing upward. Further, the display portion 60 is provided in a position close to the front surface in the depth direction of the glass top board portion 31 and the amplifier 50 is arranged behind the display portion 60 in the depth direction. In this embodiment, the display portion 60 is formed of a FL (Fluorescent Lamp).

An operation portion 70 is provided in a lower right position on the front surface of the top board portion 30 and is used to carry out an input operation for the electric device such as the amplifier 50. The operation portion 70 includes four buttons, for example. The four buttons are a power supply button 71, input switching button 72, volume down button 73 and volume up button 74 in this order from the left end. A remote controller not shown in the figure may also carry out an input operation on the amplifier 50, and an infrared light receiving portion 80 is arranged on the rear surface of the grill net 34 provided on the front surface of the top board portion 30. The amplifier 50 is controlled based on an operation signal generated by depressing any of the buttons constituting the operation portion 70 and an operation signal received at the infrared light receiving portion 80. The controlled state is displayed on the display surface 61 of the display portion 60. On the display portion 60 is displayed a status of the amplifier 50 such as power ON/OFF, a type of input selector, a type of input format, for example, Dolby Digital and DTS (Digital Theater Systems) and volume value.

Figure 4:
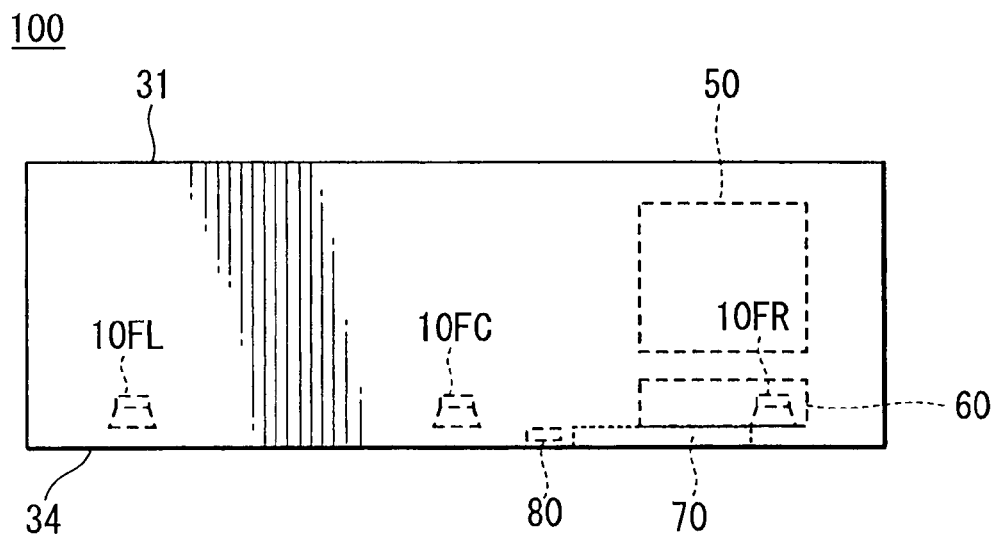
FIG. 4 is a top view of an example of a structure of a display rack according to an embodiment of this invention.
Figure 5:
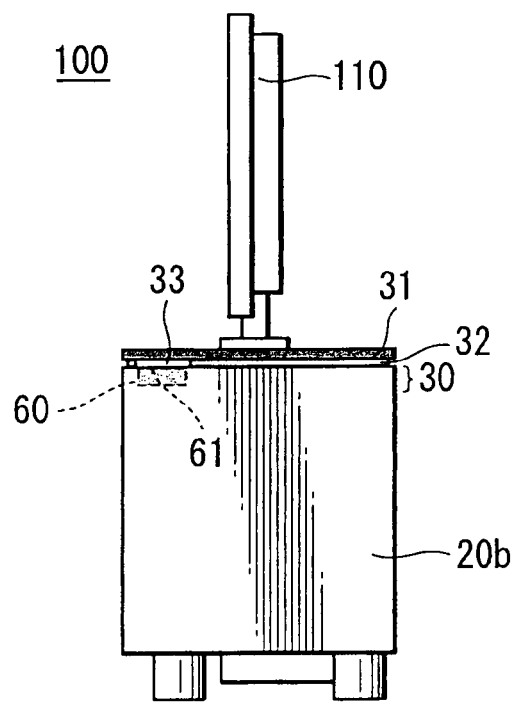
FIG. 5 is a side view of an example of a structure of a display rack according to an embodiment of this invention.
Figure 6:
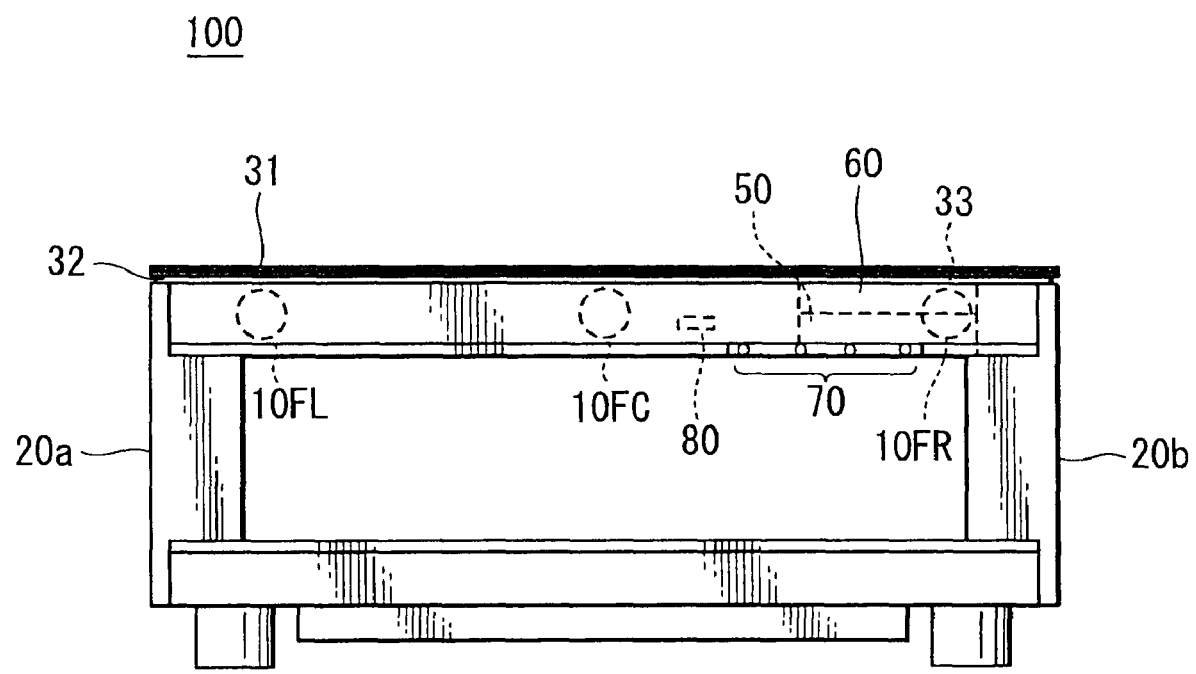
FIG. 6 is a front view of an example of a structure of a display rack according to an embodiment of this invention.

Next, with reference to FIGS. 4 to 6, details of the arrangement of the respective portions constituting the display rack 100 according to the embodiment of this invention are described. FIG. 4 is a top view of the display rack 100 seen from above. Respective portions arranged under the glass top board portion 31 (in the top board portion 30) are shown with broken lines as shown in FIG. 4. In the inside of the top board portion 30 are arranged the front-left speaker unit 10FL, front-center speaker unit 10FC, and front-right speaker unit 10FR in respective positions having a short distance in the depth direction of the top board portion 30 in this order from the left end. The display portion 60 is provided in approximately the same position as the front-right speaker unit 10FR in the depth direction of the top board portion 30 and the amplifier 50 is arranged behind the position where the display portion 60 is provided. The operation portion 70 and the infrared light receiving portion 80 are provided on right behind the surface where the grill net 34 is attached.

FIG. 5 is a view showing the right side of the display rack 100 when viewed from the front (view on the side of the leg portion 20b) according to the embodiment of this invention, where a television receiver 110 is mounted on the glass top board portion 31. The glass top board portion 31 is arranged above the top board portion 30 with the glass-top-board-portion support member 32 in between. The glass-top-board-portion support member 32 supports the glass top board portion 31 and also serves to hide respective portions stored in the top board portion 30 so as not to be shown to the user when being prepared using an opaque material (not transmitting light). However, the glass-top-board-portion support member 32 is provided between the glass top board portion 31 and the top board portion 30, a display on the display portion 60 may also be hidden, and therefore, a display hole 33 is provided in the glass-top-board-portion support member 32.

With such configuration as described above, the details displayed on the display portion 60 can be viewed from above the top surface of the glass top board portion 31. Further, the display portion 60 is arranged close to the front side in the depth direction of the display rack 100, and therefore the display surface 61 may be prevented from being hidden under a leg portion of the television receiver 110 or other display apparatus mounted on the glass top board portion 31.

FIG. 6 is a front view of the display rack 100. In the inside of the top board portion 30 are arranged the front-left speaker unit 10FL, front-center speaker unit 10FC, and front-right speaker unit 10FR in this order from the left end when seen from the front of the display rack 100. In addition, the infrared light receiving portion 80 and the operation portion 70 are provided in the lower right portions of the top board portion 30. At the right side in the inside of the top board portion 30 are provided the display portion 60 under the glass top board portion 31 and the amplifier 50 on the lower side of the display portion 60. As described above, since the display hole 33 is provided in the glass-top-board-portion support member 32 supporting the glass top board portion 31, details displayed on the display portion 60 can be seen through the glass top board portion 31. Further, since the display portion 60 is arranged close to the glass top board portion 31, a space under the display portion 60 can be used efficiently for arranging other electric devices.

Figure 7:
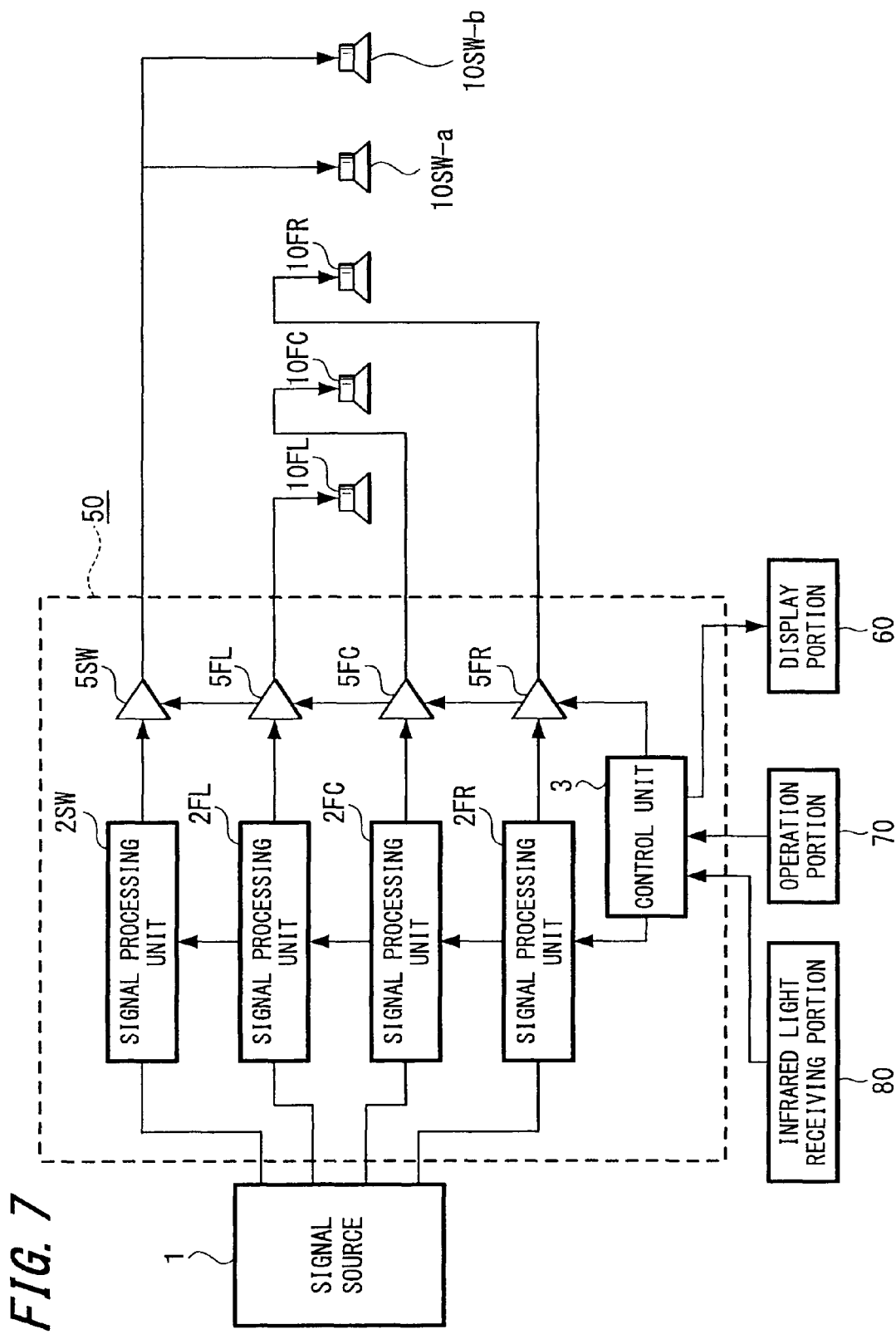
FIG. 7 is a block diagram indicating an internal configuration of a display rack according to an embodiment of this invention.

Next, an internal configuration of the display rack 100 will be described with reference to FIG. 7. First, an audio signal is supplied to the amplifier 50 from a signal source 1. A television receiver mounted on the display rack 100 is an example of the signal source 1. An audio signal output terminal of the television receiver is connected to an input terminal of the amplifier 50, thereby the audio signal output from the television receiver being input to the amplifier 50.

In the amplifier 50, an audio signal for a subwoofer, an audio signal for a center channel, an audio signal for a front-left channel, and an audio signal for a front-right channel are supplied to signal processing units 2SW, 2FC, 2FL, and 2FR, respectively. The signal processing units 2SW, 2FC, 2FL, and 2FR carry out signal processing on the audio signals of respective channels. Subsequently, the resultant audio signals of respective channels are supplied to the amplifiers 5SW, 5FC, 5FL and 5FR. The input audio signals are respectively amplified also in the amplifiers 5SW, 5FC, 5FL and 5FR. The amplified audio signals are supplied to speakers 10SW-b, 10SW-a, 10FC, 10FL, and 10FR to be then output as audio signals.

In addition, the infrared light receiving portion 80 and the operation portion 70 are connected to a control unit 3 so that various kinds of adjustment and ON/OFF operation may be carried out by operating buttons constituting the operation portion 70 or buttons provided on a remote controller or the like. The control unit 3 is also connected to the display portion 60 where the status of the amplifier 50 is displayed based on an operation signal input using the remote controller, or the like.

As described above, since the display portion 60 that displays the status of the amplifier 50 is arranged under the glass top board portion 31, the external appearance of the display rack 100 may not be affected by the display portion 60. Further, since the display portion 60 is not provided on the surface but is provided in the inside of the top board portion 30, the top board is prevented from being uneven, so that a display apparatus is arranged on the surface without restriction.

Further, the glass top board portion 31 serves as a top board of the display rack 100 and a cover protecting the display portion 60. Therefore, there is no need to separately provide the cover protecting the display portion 60, enabling manufacturing costs to be reduced.

Figure 8:
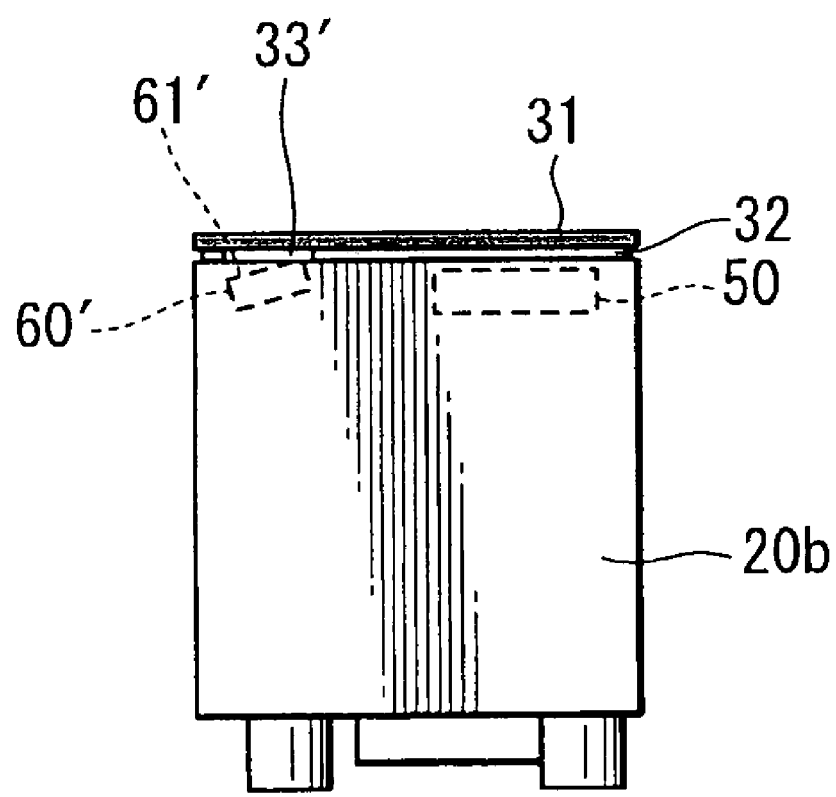
FIG. 8 is a side view of an example of a structure of a display rack according to another embodiment of this invention.

It should be noted that the display surface 61 of the display portion 60 is arranged in parallel with the glass top board portion 31 in the above-described embodiment; however, the display surface 61 may be arranged being inclined to the front surface of the display rack 100 at a predetermined angle. FIG. 8 shows an example of the inclined display portion. FIG. 8 is a side view in which the display rack 100 is seen from the right side (on the side of the leg portion 20b) when the display rack 100 is shown from the front thereof. In FIG. 8, the left side corresponds to the front of the display rack 100. As shown in FIG. 8, a display portion 60' is inclined to the front side of the display rack 100 at a predetermined angle. The glass-top-board-portion support member 32 has a display hole 33' similar to the display hole 33 that is provided when the display surface 61 of the display portion 60 is arranged in parallel with the glass top board portion 31. Accordingly, the display portion 60' can be viewed through the display hole 33' and the glass top board portion 31.

Figure 9:
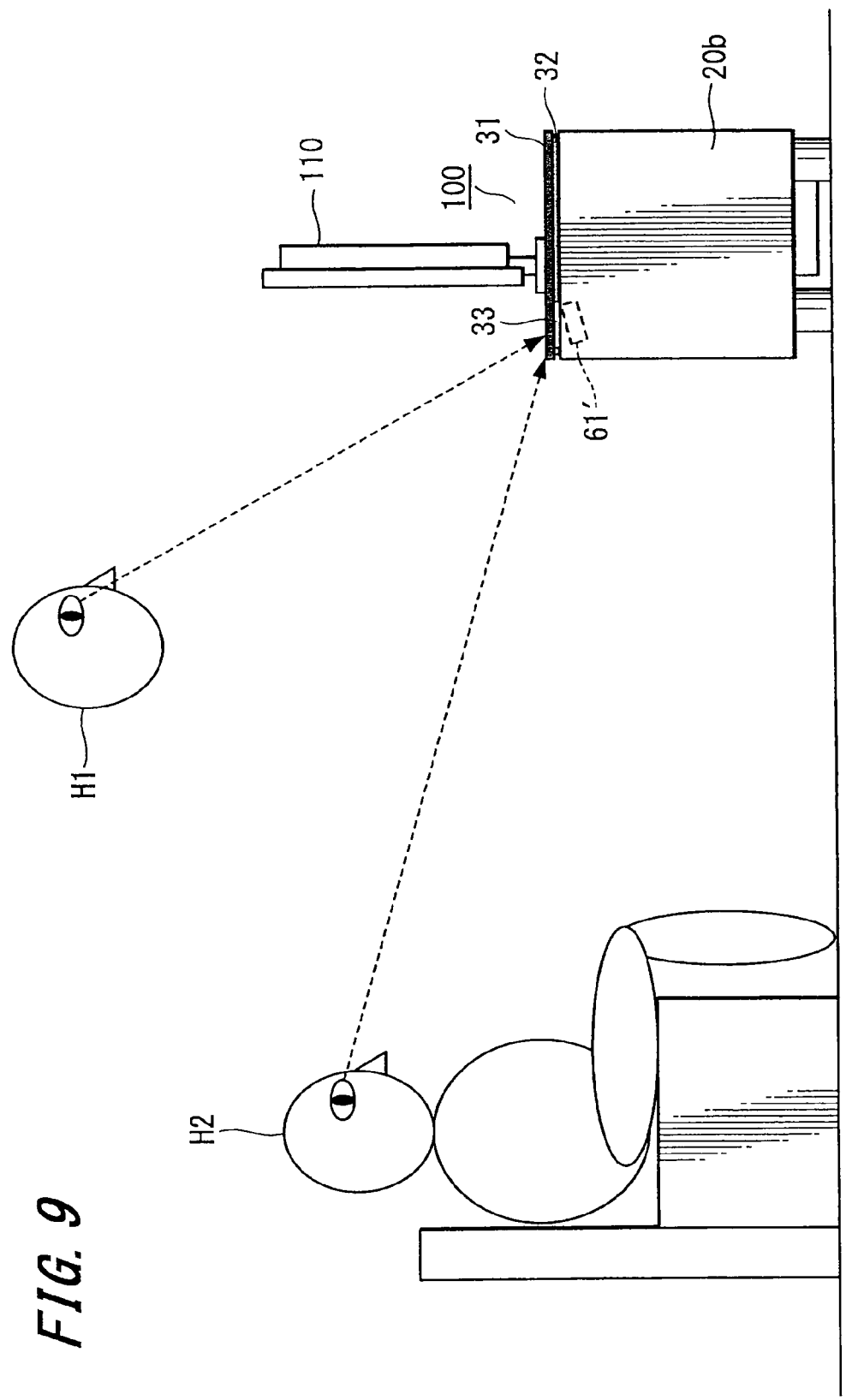
FIG. 9 is a diagram illustrating an example of a range for a viewer capable of viewing the display portion according to another embodiment of this invention.

FIG. 9 shows an example of a range for a user capable of viewing the display portion 60' when the display portion 60' is arranged being inclined at a predetermined angle. FIG. 9 is a side view of the display rack 100 seen in the direction of the leg portion 20b, in which the television receiver 110 is mounted on the glass top board portion 31. As shown in FIG. 9, a user H1 viewing the display portion 60' in a position comparatively near the display rack 100 in a substantially vertical direction can recognize details displayed on the display portion 60'. In addition, since the display portion 60' is arranged close to the front surface of the display rack 100 with an inclination to the front, a user H2 sitting in a distant position having a shallow viewing angle to the display surface 61' of the display portion 60' can recognize such details displayed on the display portion 60'.

The display portion 60' is arranged at a predetermined angle in the direction of the front surface of the display rack 100 in this case. Accordingly, the details displayed on the display portion 60' can be recognized even if the display apparatus is mounted on the glass top board portion 31 with a part of a leg portion of the display apparatus being overlapped with the position of the display surface 61'. That is, the position where the display apparatus is mounted can be selected with more flexibility.

Figure 10:
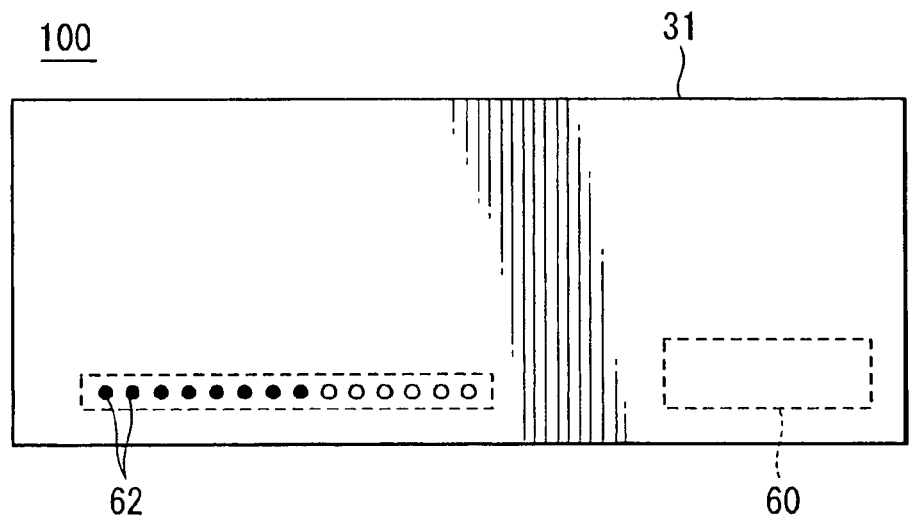
FIG. 10 is a top view of an example of a structure of the display portion according to another embodiment of this invention.

Further, according to the above-described embodiment of this invention, although the FL (Fluorescent Lamp) is used to provide the display portion 60, the display portion 60 may be formed with an LED (Light Emitting Diode) or other light-emitting materials alone. FIG. 10 shows an example of a structure in this case. FIG. 10 is a top view in which the display rack 100 is seen from above. The above-described display portion 60 is provided under the glass top board portion 31 close to the front surface of the display rack 100 in the depth direction. In addition, a plurality of light-emitting elements 62 are linearly arrayed in the lateral direction. Using the plurality of light-emitting elements 62 arrayed, values of volume for the amplifier 50 or the like can be expressed. In this case also, holes for the light-emitting elements 62 are provided to the glass-top-board-portion support member 32 (not shown in the figure) supporting the glass top board portion 31. Therefore, light emitted from the light-emitting elements 62 can be seen through the glass top board portion 31. FIG. 10 illustrates an example in which the light-emitting elements 62 is provided in a row, however, a plurality of light-emitting elements may be arrayed in a matrix so that letters or the like can be expressed as those in an electronic signboard, where the letters may be read in a stream moving in the direction of left to right, or the like.

Figure 11:
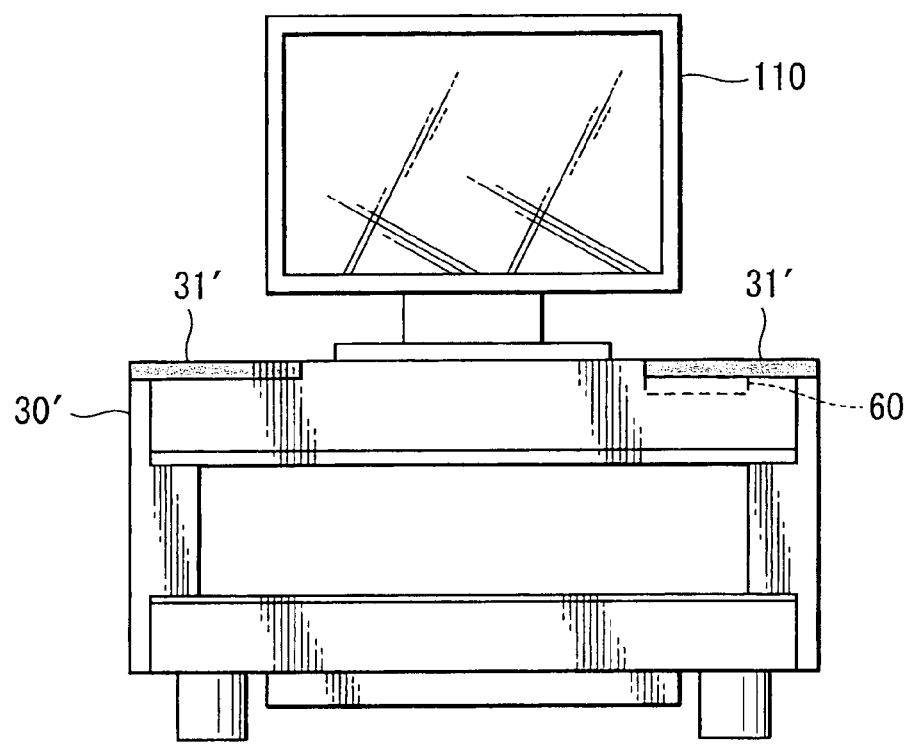
FIG. 11 is a front view of an example of a structure of a glass top board portion according to another embodiment of this invention.

Further, according to the above-described embodiments of this invention, the glass top board portion 31 is provided to cover the whole surface of the top board portion 30. However, the glass top board portion 31 may be arranged for a part of the area of the top board portion 30. FIG. 11 shows an example of a structure of the display rack in such case. FIG. 11 is a front view of the display rack 100. As shown in FIG. 11, the glass top board portions 31' are provided to areas at a part of the left end and a part of the right end in this example. In this structure, details displayed on the display portion 60 can be seen through a glass top board portion 31' provided at the right end above the display portion 60.

Further, according to the embodiments of this invention, a transparent glass plate is used as the glass top board portion 31. However, other glass plate such as ground glass plates not completely transparent or the like may be used as the glass top board portion 31, as long as the plate has transmittance with which details displayed on the display portion 60 can be seen through the glass top board portion 31. In addition, a glass plate having a transparent area, through which only the display portion 60 can be seen, as a part of area of the glass top board portion 31 may be used as the glass top board portion 31.

Further, according to the embodiments of this invention, the glass-top-board-portion support member 32 is used to arrange the glass top board portion 31 on the top board portion 30. However, the glass-top-board-portion support member 32 may not be used and the glass top board portion 31 may be directly provided on the top board portion 30.

Further, a glass plate is used in the embodiments of this invention. However, any material having sufficient light transmittance, strength to receive the weight of a display apparatus, and surface hardness against friction or the like can be used to form a top board portion.

Furthermore, a 3.1 channel speaker system is used as an example of the speaker system in the above-described embodiments. However, the embodiments can also be applied to other configurations such as incorporating speakers only for the right and left channels, arranging only one woofer speaker that emits sound in a bass range, and the like.

Moreover, the above-described embodiments can be applied to various other configurations in which, for example, four speaker units, six speaker units including a subwoofer are provided for obtaining a surround sound environment of 5.1 ch or the like. In addition, the embodiments can be used to obtain other channel configurations than the 5.1 ch surround sound environment.

It should be understood by those skilled in the art that various modifications, combinations, sub-combinations and alterations may occur depending on design requirements and other factors insofar as they are within the scope of the appended claims or the equivalents thereof.

What is claimed is:

1. A display rack on which a display apparatus is mounted, comprising:
    an amplifier amplifying an audio signal input from a signal source of the display apparatus;
    a first top board portion storing the amplifier, said first top board portion having a top surface;
    a second top board portion formed of a transparent member and arranged above and entirely covering the top surface of the first top board portion; and
    a display portion indicating a status of the amplifier and arranged under the second top board portion with a display surface thereof facing upward.
2. The display rack according to claim 1, wherein the display portion is arranged in a position close to a front side in a depth direction of the second top board portion.
3. The display rack according to claim 1, wherein the display portion is arranged with the display surface of which is inclined at a predetermined angle in the direction of the front side of the display rack.
4. The display rack according to claim 1, wherein the display portion includes a plurality of light-emitting elements.
5. The display rack according to claim 1, further comprising:
    a support member arranged between the first top board portion and the second top board portion, the support member being opaque and having a hole at a position corresponding to the display portion.
6. The display rack according to claim 1, further comprising:
    at least two front speakers, stored in the first top board portion, that receive a front audio signal from the amplifier and; and
    a subwoofer speaker, stored in a low portion of the display rack, that receives a subwoofer audio signal from the amplifier.

* * * * *